US007639681B2

(12) United States Patent
Kelly et al.

(10) Patent No.: US 7,639,681 B2
(45) Date of Patent: Dec. 29, 2009

(54) SYSTEM AND METHOD FOR A DISTRIBUTED SERVER FOR PEER-TO-PEER NETWORKS

(75) Inventors: Stephen T. Kelly, Redmond, WA (US); Jeffrey B. Erwin, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 614 days.

(21) Appl. No.: 10/996,895

(22) Filed: Nov. 23, 2004

(65) Prior Publication Data

US 2006/0126611 A1   Jun. 15, 2006

(51) Int. Cl.
*H04L 12/56* (2006.01)
(52) U.S. Cl. ........................ 370/389; 370/408
(58) Field of Classification Search ................. 370/351, 370/389, 400, 408, 409
See application file for complete search history.

(56) References Cited

U.S. PATENT DOCUMENTS

| 6,157,898 | A | 12/2000 | Marinelli ............... 702/141 |
| 6,224,493 | B1 | 5/2001 | Lee et al. ............... 473/223 |
| 6,402,634 | B2 | 6/2002 | Lee et al. ............... 473/223 |
| 6,441,745 | B1 | 8/2002 | Gates ...................... 340/669 |
| 7,281,137 | B1* | 10/2007 | Vitikainen ............... 713/189 |
| 2001/0037384 | A1* | 11/2001 | Jemes et al. ............. 709/223 |
| 2002/0077189 | A1 | 6/2002 | Tuer et al. ............... 473/151 |
| 2002/0137459 | A1* | 9/2002 | Ebata et al. .............. 455/16 |
| 2003/0088673 | A1 | 5/2003 | White et al. ............. 709/226 |
| 2004/0103275 | A1* | 5/2004 | Ji et al. ................... 713/150 |
| 2005/0192710 | A1 | 9/2005 | Thornton et al. ......... 700/284 |
| 2005/0215335 | A1 | 9/2005 | Marquardt ............... 473/131 |
| 2006/0013190 | A1* | 1/2006 | Leroy et al. ............. 370/349 |
| 2006/0218167 | A1* | 9/2006 | Bosley et al. ............ 707/100 |

FOREIGN PATENT DOCUMENTS

| DE | 103 38 620 A1 | 3/2005 |
| EP | 1 232 772 A2 | 8/2002 |
| WO | WO 03/081875 A1 | 10/2003 |
| WO | WO 2004/056425 A2 | 7/2004 |
| WO | WO 2005/044396 A2 | 5/2005 |
| WO | WO 2005/094953 A2 | 10/2005 |

OTHER PUBLICATIONS

McAuley, A.J. et al., "Self-Configuring Networks", IEEE, 21st Century Military Communications Conference Proceedings, Oct. 22-25, 2000, pp. 315-319.

(Continued)

*Primary Examiner*—William Trost, IV
*Assistant Examiner*—Roberta A Shand
(74) *Attorney, Agent, or Firm*—Merchant & Gould, P.C.

(57) ABSTRACT

A logical distributed server is generated for managing (Internet Protocol (IP) address allocation for an ad-hoc, self-forming peer-to-peer (P2P) network. The logical distributed server is generated according to messaging scheme where nodes on the P2P network allocate addresses for themselves and for clients connected to them. Each node implements a server that listens on the incoming client connections. Each node maintains data structures that represent the current state of an address database. Routing requests are fielded by the nodes from the clients and the messaging scheme is used to inform other nodes of its action so a consistent address space is maintained between all the nodes on the P2P network.

21 Claims, 7 Drawing Sheets

OTHER PUBLICATIONS

McAuley, A. et al., "Experience with Autoconfiguring a Network with IP addresses", IEEE, Communications for Network-Centric Operations: Creating the Information Force, Oct. 28-30, 2001, pp. 272-276.

Nesargi, S. et al., "MANETconf: Configuration of Hosts in a Mobile Ad Hoc Network", IEEE, 21st Annual Joint Conference of the IEEE Computer and Communications Societies, Jun. 23-27, 2002, pp. 1059-1068.

Shiflet, C. et al., "Address Aggregation in Mobile Ad hoc Networks", IEEE Communications Society, 2004 IEEE International Conference on Paris, France, Jun. 20-24, 2004, pp. 3734-3738.

* cited by examiner

SYSTEM AND METHOD FOR A DISTRIBUTED SERVER FOR PEER-TO-PEER NETWORKS

BACKGROUND OF THE INVENTION

Peer-to-peer communication between devices is becoming a more prevalent and accepted method of providing network communication. A peer-to-peer network is a network loosely bound by connections in a group of computing devices that allows the computing devices to share resources directly. There are many peer-to-peer networks that have been created on the backbone of other network infrastructures. These network infrastructures usually include some level of management, whether the infrastructure is the Internet or another local network. The management often takes the form of one or more servers responsible for addressing destinations on the network and routing the information to these destinations. The addressing scheme may use one or more of several different protocols to address destinations and route information. For example, one network infrastructure protocol is DHCP (Dynamic Host Configuration Protocol). DHCP is an Internet protocol for automating the configuration of computers that use TCP/IP. DHCP can be used to automatically assign IP addresses, to deliver TCP/IP stack configuration parameters such as the subnet mask and default router, and to provide other configuration information such as the addresses for time servers. Traditionally, a network using DHCP is managed by a dedicated computing device referred to a DHCP server.

Traditional models, such as a network using standard DHCP, fail when no infrastructure yet exists. The idea of ad-hoc, self-forming peer-to-peer networks that do not require any prior network infrastructure or administration is relatively new with many hurdles to overcome. One of the hurdles is how to provide an addressing scheme when dedicated computing devices are not provided on the peer-to-peer network to manage addressing.

SUMMARY OF THE INVENTION

Embodiments of the present invention relate to a system and method for providing a distributed server for a self-forming peer-to-peer network. In accordance with one aspect of the present invention, a number of mesh boxes, or mesh nodes, are combined to form a mesh network (wherein a mesh network is one type of a peer-to-peer network that includes mesh boxes acting as the cooperative agents of the network). The mesh network allows transfer of data between mesh nodes and clients connected to the mesh nodes without the requirement of pre-existing network structure elements (i.e., dedicated servers, etc.). The present invention provides for a logical, database driven, distributed server by configuring the mesh nodes to adhere to a selected messaging scheme. The messaging scheme spreads the responsibility for managing the address space of the network and client subnets across the various mesh nodes included on the mesh network.

In accordance with one aspect of the present invention, a computer-implemented method for cooperatively managing a routed IP address space in the absence of managed network services is provided. The method includes identifying cooperative agents on a backbone network, selecting a backbone address for a current cooperative agent on the backbone network, selecting a client subnet address that corresponds to the current cooperative agent, and notifying other cooperative agents on the backbone network of the client subnet address selection.

In accordance with another aspect of the present invention, a computer-readable medium is provided that includes computer-executable instructions for identifying neighboring mesh nodes on a mesh network and obtaining routing tables corresponding to any neighboring mesh nodes. The routing tables include address allocations made by the neighboring mesh nodes. The instructions further include selecting a mesh-facing address for a current mesh node on the mesh network, selecting a client subnet range of addresses that corresponds to the current mesh node, and notifying other mesh nodes on the mesh network of the client subnet range selection by the current mesh node.

In accordance with still another aspect of the present invention, a system for cooperatively managing a routed IP address space in the absence of managed network services includes a mesh network having mesh nodes included therein, and a logical server distributed across the mesh network that is configured to execute a set computer-executable instructions on each of the mesh nodes. On each of the mesh nodes, the server configuration identifies neighboring mesh nodes on the mesh network by broadcasting a discovery message that determines whether other mesh nodes are within communication range of the current mesh node. The current mesh node then obtains routing tables corresponding to any neighboring mesh nodes, wherein the routing tables include address allocations made by the neighboring mesh nodes. A mesh-facing address is selected for a current mesh node on the mesh network, as well as a client subnet range of addresses that corresponds to the current mesh node. Other mesh nodes on the mesh network are notified of the client subnet range selection by broadcasting an allocation message to the neighboring mesh nodes. The allocation message includes and indicator that the client subnet range has been allocated by the current mesh node.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
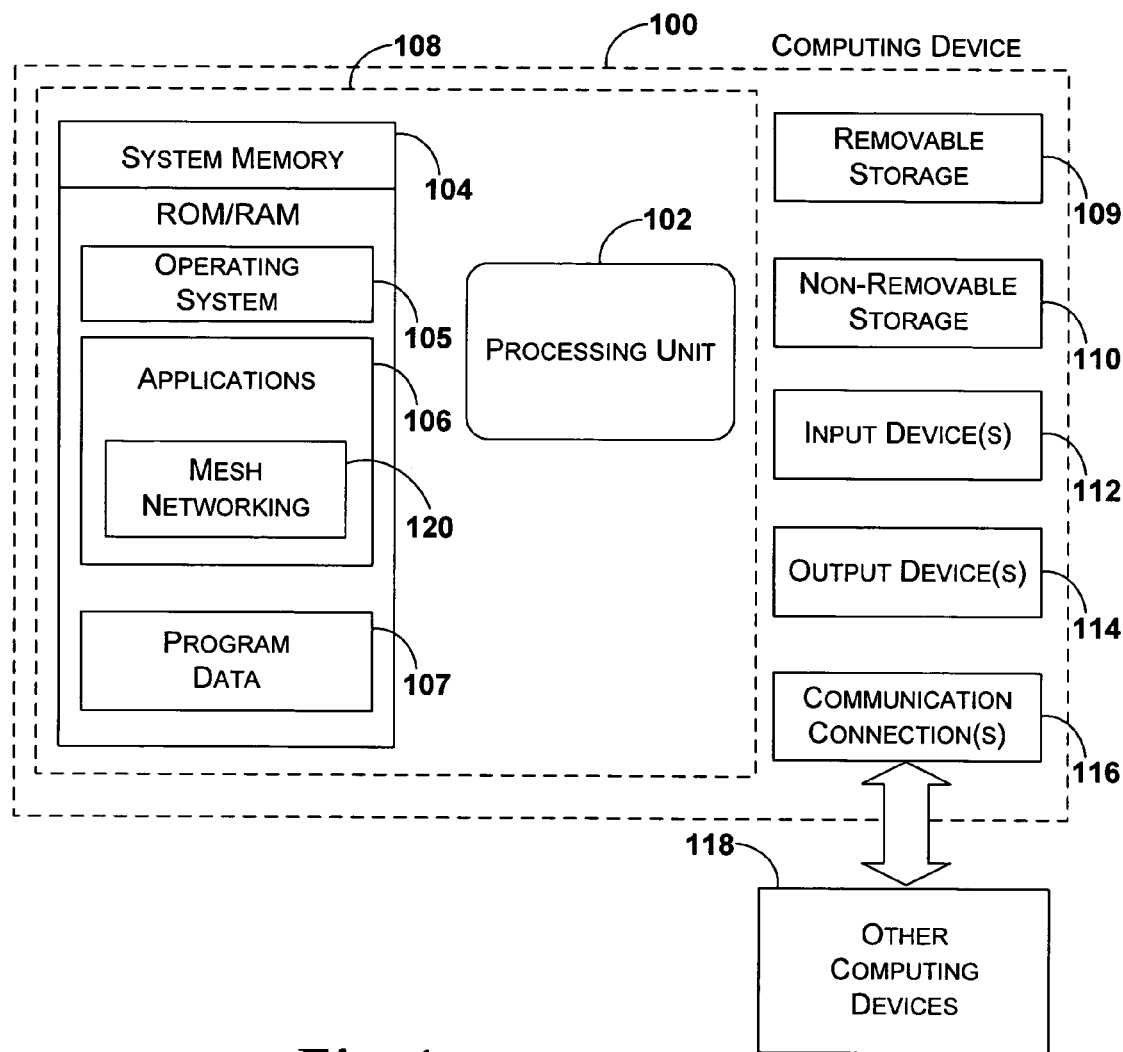
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for implementing mesh networking functionality and/or a distributed server in accordance with the present invention. The functionality represented by application 120 may be further supported by additional input devices, 112, output devices 114, and communication connection(s) 116 that are included in computing device 100 for establishing and maintaining a mesh network.

Figure 2:
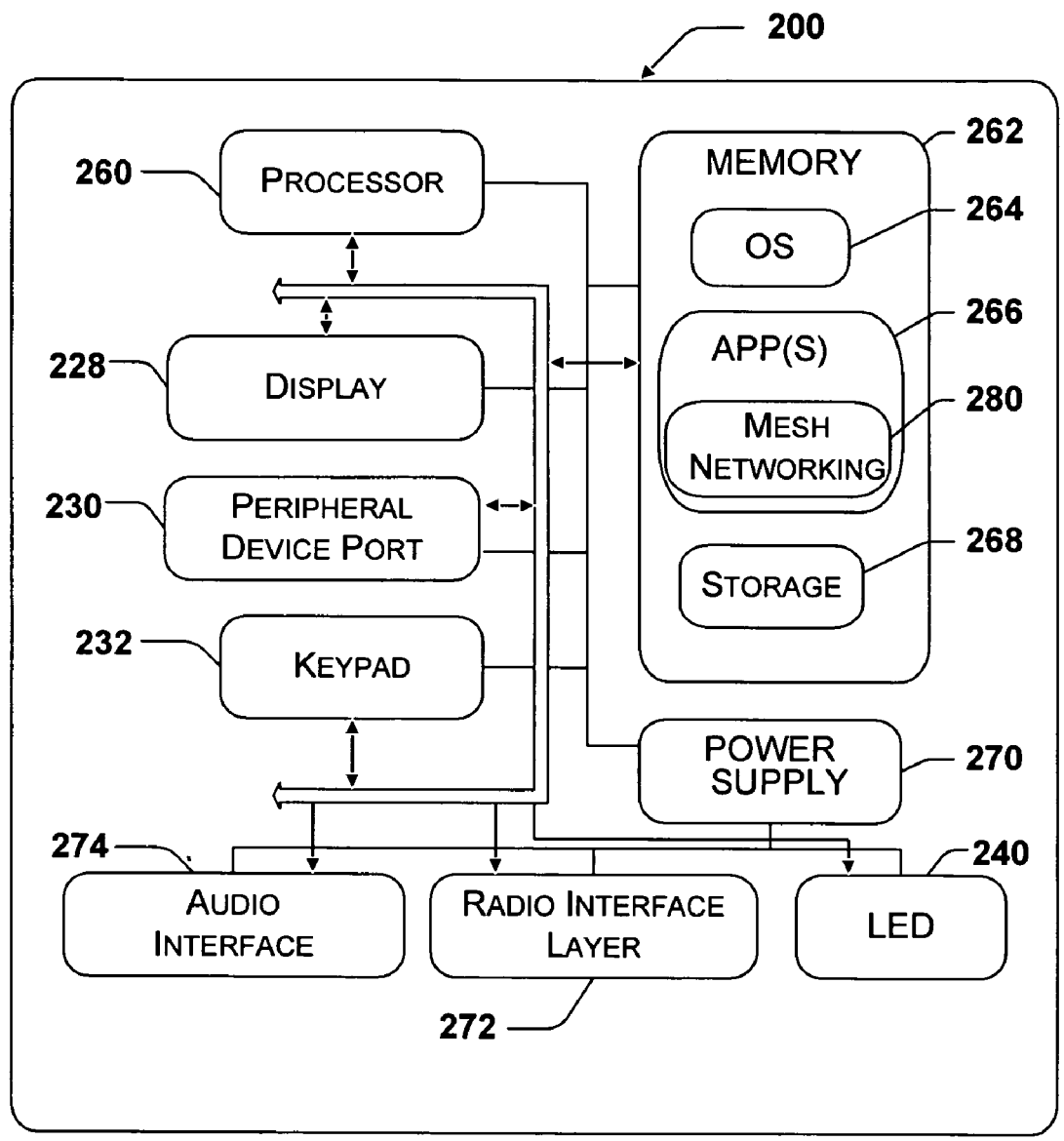
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264.

In other words, communications received by the radio interface layer 272 may be disseminated to application programs 266 via the operating system 264, and vice versa.

In one embodiment, applications 266 further include an application 280 for implementing mesh networking functionality and/or a distributed server in accordance with the present invention. The functionality represented by application 280 may be further supported by structure in radio interface layer 272 that is included in mobile device 200 for establishing and maintaining a mesh network.

Figure 3:
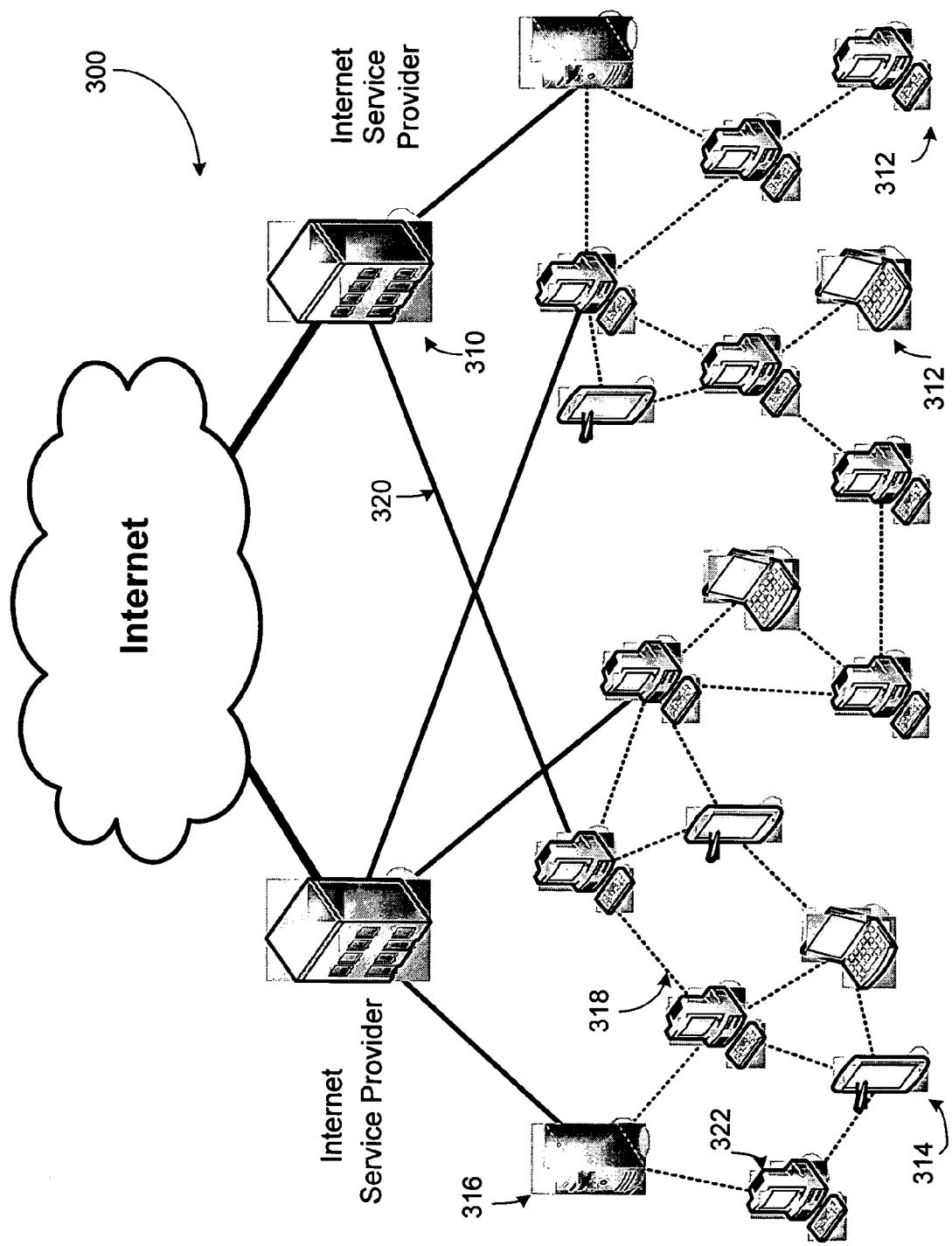
FIG. 3 illustrates an exemplary mesh network that may be used in one exemplary embodiment of the present invention.

FIG. 3 illustrates a mesh network 300 that may be used in one exemplary embodiment of the present invention. Mesh network 300 may comprise any topology of mesh nodes, Internet service providers, and communication media. Also, the mesh network 300 may have a static or dynamic topology without departing from the spirit and scope of the present invention.

The mesh network 300 includes one or more Internet service providers 310, which provide Internet access points for one or more mesh nodes. Each mesh node may comprise any device that is connected to the mesh network 300. The mesh node may transmit and receive data packets and also may pass data packets to other mesh nodes in accordance with the routing protocol of the mesh network 300. The mesh node may be a fixed device or a mobile device. For example, the mesh node may include a computing device 312 that is similar to computing device 100 described above in conjunction with FIG. 1. The mesh node may also include a mobile computing device 314 that may be similar to mobile computing device 200 described above in conjunction with FIG. 2. Other embodiments may include other configurations of mesh nodes. For example, a mesh node may include a dedicated computer that only routes data packets from one mesh node to another such as the mesh box 316.

In one exemplary embodiment of the present invention, the mesh network 300 has a network topology in which mesh nodes are connected with several redundant connections between the mesh nodes. The mesh network 300 may include a full mesh where every mesh node is connected to every other mesh node in the mesh network. Mesh network 300 may also include a partial mesh topology where some mesh nodes are organized in a full mesh and other mesh nodes are only connected to one or two other mesh nodes. Other mesh topologies may include one or more client subnets connected to the mesh network. These client subnets may have a plurality of clients connected thereto. For example, the client subnets may include a set of computing devices connected to a particular mesh box through a network connection other than the mesh network. These clients in the subnet gain access to other resources by routing data traffic through the mesh box to the mesh network. Accessing the mesh network through the mesh box allows the client devices to gain access to the Internet and other resources with the mesh box managing the routing of the data. The various topologies for the mesh network 300 are endless and will not be further set forth herein.

Reference number 318 indicates communication media between the mesh nodes. By way of example, and not limitation, communication media 318 may include wired media such as a wired network or direct-wired connection, and wireless media such as acoustic, RF, infrared and other wireless media. Reference number 320 indicates communication media between Internet service provider 310 and one or more of the mesh nodes. The communication media 320 may include wired media such as a wired network or direct-wired connection, and wireless media such as acoustic, RF, infrared and other wireless media.

In the mesh network 300, mesh nodes may transmit and receive data packets from other mesh nodes and/or from the Internet. Routing tables typically determine what path a data packet traverses through the mesh network. The routing of a data packet is commonly determined at a source node. Stated another way, the node sending a data packet may determine the route a data packet takes through the mesh network. A data packet routed from a mesh node to reach another mesh node is typically referred to as a "hop." For example, if mesh node 314 desires to transmit a data packet to mesh node 316, the routing tables accessible to mesh node 314 may indicate routing will take place through mesh node 322. Accordingly, the data packet will make two hops (mesh node 314 to mesh node 322 and mesh node 322 to mesh node 316). In general, latency increases proportionally with the number of hops a data packet must make to reach a mesh node. Also, routing tables may indicate several available paths for a data packet to traverse to reach a destination. Routing tables may also indicate that a destination mesh node is inaccessible because the number of hops is too great. However, use of a routing table assumes that the network nodes have been addressed for routing the data through mesh network 300.

Illustrative Embodiments for a Distributed Server for a Peer-to-Peer Network

Embodiments of the present invention are related to distributing the address space management of an ad-hoc network across multiple computing devices included on the network. For example, a network may include one or more mesh boxes, or mesh nodes. These mesh nodes are configured to self-form a wireless network with other mesh boxes within a particular range. Many of these mesh nodes may provide a connection to the mesh network for a number of client computing devices. Other mesh nodes may provide Internet egress points to the computing devices connected to the mesh network. The present invention provides and addressing scheme for allowing the client computing devices to route their Internet traffic through the mesh network and to a particular Internet egress point. The addressing scheme provides for assignment of network addresses such that this routing of data may be accomplished while preventing multiple network address translation (NAT) points in the route.

In one embodiment, a messaging scheme is used to inform the mesh nodes of the state of the address space and changes thereto. The messaging scheme allows the mesh nodes to be coordinated to manage an address space without the use of administrators or dedicated servers.

Each mesh box implements a DHCP server that listens on the incoming client (as opposed to the mesh) connections. Each mesh box maintains data structures that represent the current state of the DHCP database as the mesh box understands it. DHCP requests are fielded by the mesh box and the messaging scheme mentioned previously is used to inform other mesh boxes of its action so a consistent address space is maintained between all the mesh boxes.

Figure 4:
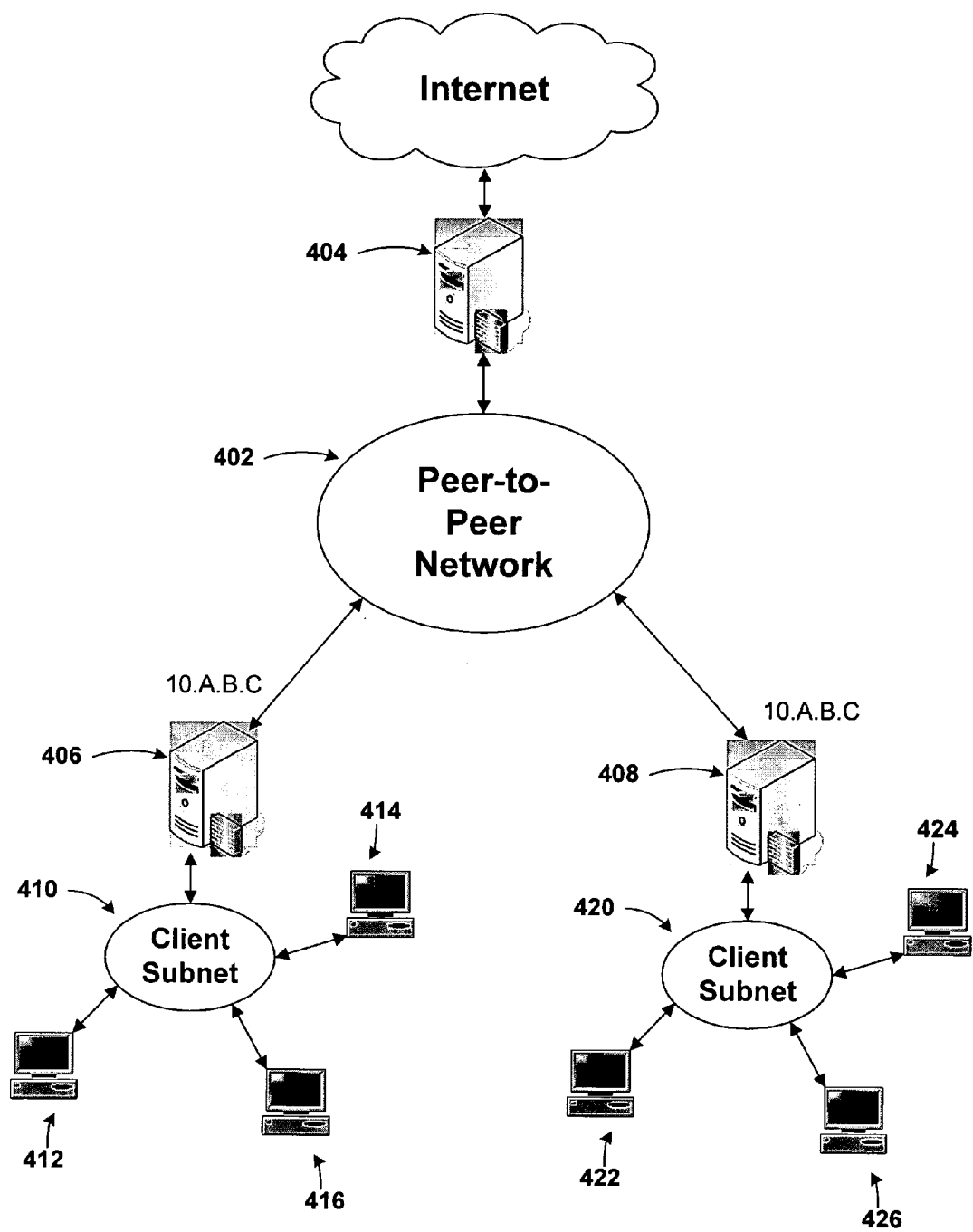
FIG. 4 illustrates an exemplary peer-to-peer topology for one embodiment of the present invention.

FIG. 4 illustrates an exemplary peer-to-peer topology for one embodiment of the present invention. System 400 includes peer-to-peer (P2P) network 402, peer-to-peer (P2P) computing devices (e.g., mesh boxes) 404, 406, 408, client subnets 410, 420, and client computing devices 412, 414, 416, 420, 422, 426.

Figure 5:
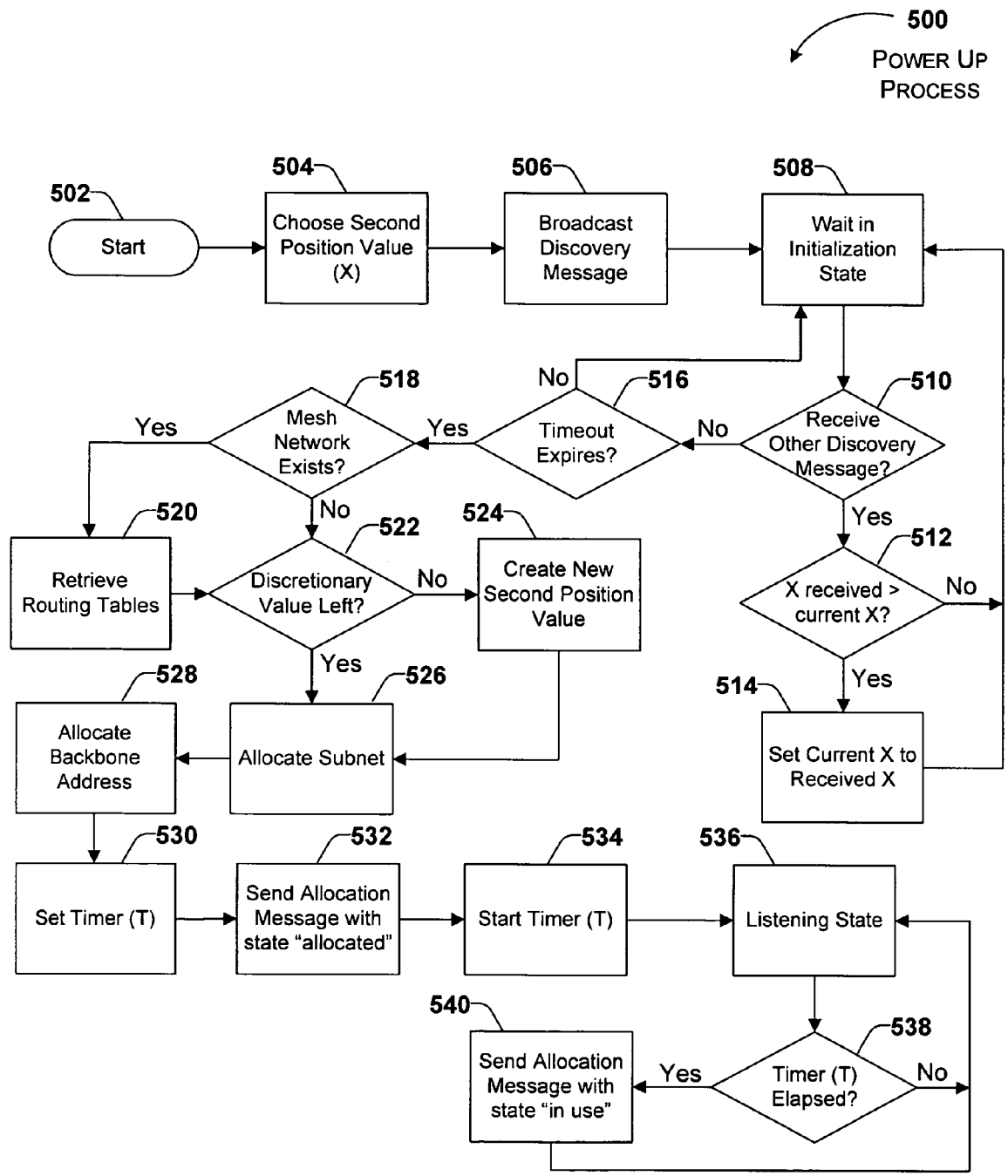
FIG. 5 illustrates an exemplary logical flow diagram of a power up process in accordance with the present invention.

As P2P devices (e.g., 406) are added to P2P network 402, they are configured to take advantage of a provided portion of the address space, or to allocate a portion of the address space (see FIG. 5). In a self-forming and self-managing P2P network, the concept of a single DHCP server is not feasible. A DHCP server requires that an individual (e.g., administrator)

set it up and administer it. In P2P network 402, there is no administrator, no single point of control, and no network infrastructure to rely on for DHCP services. The present invention serves DHCP addresses from multiple locations and multiple devices (e.g., 406) on P2P network 402. The devices (e.g., 406) that self-form to create P2P network 402, also provide DHCP services to their client computing devices (e.g., 412) while operating from a single, distributed DHCP database. As an example, in a self-forming mesh network (e.g., network 402), the mesh boxes (e.g., 406) discover each other, authenticate each other, and form the P2P network. The P2P network is configured according to the present invention to allow clients (e.g., 412) connected to one mesh box (e.g., 406) to communicate with clients (e.g., 422) attached to another mesh box (e.g., 408) somewhere on the mesh. Each mesh box (e.g., 406) supplies IP (Internet Protocol) addresses to its clients (e.g., 412). The clients may then communicate with other clients attached to other mesh boxes having their own IP addresses provided by their respective mesh boxes.

In one embodiment, mesh boxes create amongst themselves a single logical DHCP server based on a protocol, similar to core backbone router protocols, whereby the mesh boxes act on a single logical DHCP database. Mesh boxes are able to allocate addresses for themselves and for clients connected to them. Addresses are chosen from the private network 10.B.C.D space. When the database for a mesh sub-network is created, a value is chosen at random for the second position. All nodes within that mesh sub-network use that randomly chosen value in the second position. For example, if the value 213 is chosen, then all nodes in the mesh sub-network have addresses starting with 10.213. A subnet mask for this example is 255.255.0.0. Other values and subnet mask values may be selected without departing from the spirit or scope of the present invention.

In another embodiment, each mesh box and its set of clients share a client subnet of addresses. The number of bits chosen for the client subnet size (i.e. the number of hosts) is a trade-off between having enough addresses for a normal home and not wasting address space. For example, a 4 bit space is may be used for each client subnet, allowing 16 hosts. Note however, that this does not restrict how many client subnets a mesh box can allocate for it's attached client network. If mesh box runs out of room on one client subnet for hosting client computing devices it can allocate additional client subnets. With the 4 bit space example, the remaining 12 bits that comprise an IP address are randomly chosen values. Stated differently, the mesh box is free to choose a random value in this range when allocating a subnet. For instance, using the previous example where 213 is the randomly chosen value for the second position, the client subnet address for the devices connected to the mesh box might be 10.218.1.16 with a subnet mask 255.255.255.240.

In an additional embodiment, using the present addressing scheme allows an algorithm to be implemented that allows mesh boxes to select between available Internet egress points. When a mesh box hands out an address to a corresponding client computing device, the mesh box gives its own client facing address as the default gateway. Thus, the client is not required to change any of its configuration information based on changes to the egress point.

FIG. 5 illustrates an exemplary logical flow diagram of a power up process in accordance with the present invention. Process 500 starts at block 502 where a mesh node or mesh box is powered up on a mesh network (e.g., P2P network 402 shown in FIG. 4). The mesh node may have one or more client computing devices networked through a client subnet (e.g., client subnet 410). After the mesh node is powered up and connected to the mesh network, processing continues at block 504.

At block 504, a random value (X) is selected for the second position, or the second byte, of the IP address for the mesh node (e.g., 10.X.C.D). Once a random value is selected, processing moves to block 506.

At block 506, a discovery message is broadcast to any additional mesh nodes that are in range of the current mesh node. In one embodiment, the range is such that the current mesh node and the other mesh nodes are considered neighbors, or immediately connected with one another. In one embodiment, the discovery message includes the X value that corresponds to the second byte of the IP address. Once the discovery message is broadcast, processing continues at block 508.

At block 508, the mesh node waits in an initialization state for specified occurrence. In one embodiment, the specified occurrence is the lapse of a specified number of seconds that corresponds to a timeout property. While the mesh node waits in the initialization state, processing continues to decision block 510.

At decision block 510, a determination is made whether the current mesh box has received any other discovery messages from other mesh boxes while in the initialization state. If another discovery message is received from another mesh box, processing moves to decision block 512 to make a selection between the two allocated address spaces. However, if no other discovery messages are received processing advances to decision block 516.

At decision block 512, a determination is made whether the X value included in the received discovery message is greater than the X value randomly generated by the current mesh box. If the received X value is greater than the current X value, then processing moves to block 514. However, if the received X value is less than the current X value then processing returns to the initialization state of block 508.

At block 514, the current value of X is set to match the received value of X. Changing the current value of X solves for the conflicting address spaces between neighboring mesh nodes when both mesh nodes are in the initialization phase and a mesh network does not already exist. For example, a first mesh node may emerge on the network and send a discovery message that indicates an allocation of a mesh-facing address corresponding to 10.15.C.D. A second mesh node may simultaneously emerge on the network and send a discovery message that indicates an allocation of a mesh-facing address corresponding 10.23.C.D. In order for the two mesh nodes to operate according to the same address space, the first mesh node and second mesh node are configured to select the higher byte level to resolve the conflict. Accordingly, the first mesh node changes its second byte to 23, so that the address allocation of the mesh network may proceed with the conflict resolved. This type of conflict resolution does not occur if either mesh node is beyond the initialization phase or either mesh node encounters another mesh node past the initialization phase. Changes in X to correspond to the higher byte level are reserved for when two mesh nodes are simultaneously broadcasting their discovery messages. Accordingly, once the current value of X is changed to correspond to the received value of X, processing returns to the initialization state of block 508.

At decision block 516, a determination is made whether a timeout property has expired during the initialization state. If the timeout property has not expired, then processing returns to block 508 and the mesh node remains in the initialization state. However, if the timeout property has expired, the mesh node exits the initialization state and processing moves to decision block 518.

At decision block 518, a determination is made whether an existing mesh network was discovered in responds to the broadcast discovery message. If no mesh network currently exists, processing advances to decision block 522. However, if an existing mesh network is discovered processing moves to block 520.

At block 520, the routing tables that correspond to the neighboring mesh nodes are retrieved. The routing table of each mesh node provides a description of the current address allocations of the mesh nodes on the mesh network. Once the routing tables are retrieved, processing moves to decision block 522.

At decision block 522, a determination is made whether, according to any retrieved routing tables, there is a discretionary value left for allocation. It may be that the allocation of IP addresses for other mesh nodes has consumed the address space corresponding to the current value (X) of the second position. In one embodiment, the discretionary value corresponds to the 12 bit randomly generated value that is left from the allocation of the 4 bit space for the client subnet mentioned previously. If a determination is made that there is allocation room left under the currently allocated address space, processing advances to block 526. However, if a determination is made that there is no discretionary value left, processing proceeds to block 524.

At block 524, a new second position value (e.g., Y) is allocation for providing an address space for the mesh node. The new second position value (Y) may be coordinated with the original second position value (X) to continue to manage the mesh network under a single address space. Once the new second position value is allocated, processing continues at block 526.

At block 526, a client subnet is allocated for the mesh node and any attached client computing devices. For example, a value for the 12 discretionary bits that is not currently allocated as indicated by the routing tables may be used to differential the client subnet of the current mesh node. Once the client subnet is allocated, processing moves to block 528.

At block 528, an address is allocated on the backbone of the mesh network. In one embodiment, this mesh-facing address is selected to have a value that corresponds to 10.X.B.C, where X is the prior defined second position value. Once the backbone or mesh-facing address is allocated for the mesh node, processing continues at block 530.

At block 530, a timer (T) is set that corresponds to allocation of the addresses by the mesh node. The timer (T) provides a time limit for confirming the allocation of the addresses for the mesh node. Once the timer (T) is set to a selected limit (e.g., 5 minutes), processing proceeds to block 532.

At block 532, an allocation message is broadcast to the neighbors for the neighbors of the mesh node as defined by the client subnet and backbone addresses. The allocation message includes an indicator that the addresses are "allocated" and are awaiting the expiration of the period set by the timer (T) to confirm the allocation. In one embodiment, the allocation message includes a hop count that limits the number of hops that the allocation message is propagated through the mesh network. The hop count corresponds to a similar hop limit that prevents data from being routed beyond a certain number of hops across the network. Since the need for the consistency of the managed address space is limited to the routing range of the data, mesh nodes sufficiently separated across the mesh network may have the same address allocation without creating a conflict.

In another embodiment, the allocation message also includes a timestamp that represent the time the current mesh node's routing table was last changed. The timestamp allows other mesh nodes to ignore the allocation message if they have seen this message before (i.e., changes haven't occurred since the last time it was sent.)

Additionally, the allocation message may also include a sequence number that uniquely identifies the mesh node the originated the allocation message. The sequence number provides another indicator of source for resolution between potentially conflicting allocation messages. Once the allocation message is broadcast, processing proceeds to block 534.

At block 534, the timer (T) that provides the confirmation period for the allocation of addresses is started. Starting the timer (T) coincides with the broadcast of the allocation message. Once the timer (T) is started processing moves to block 536.

At block 536, the mesh node enters a listening state. During the listening state the mesh node may receive DHCP requests from client computing devices (see FIG. 6), other allocation messages from other mesh nodes (see FIG. 7), or the timer (T) period may elapse. After the mesh node enters the listening state, processing continues at decision block 538.

At decision block 538, a determination is made with the timer (T) period has elapsed. If the timer (T) period has not elapsed, processing returns to block 536, where the mesh node remains in the listening state. However, of the timer (T) period has elapsed, processing moves to block 540.

At block 540, an updated allocation message is broadcast to the neighbors of the mesh node as defined by the client subnet and backbone addresses. The allocation message includes an indicator that the addresses are now "in use" and, barring any additional conflicts, are allocated to the current mesh node and its client subnet.

Figure 6:
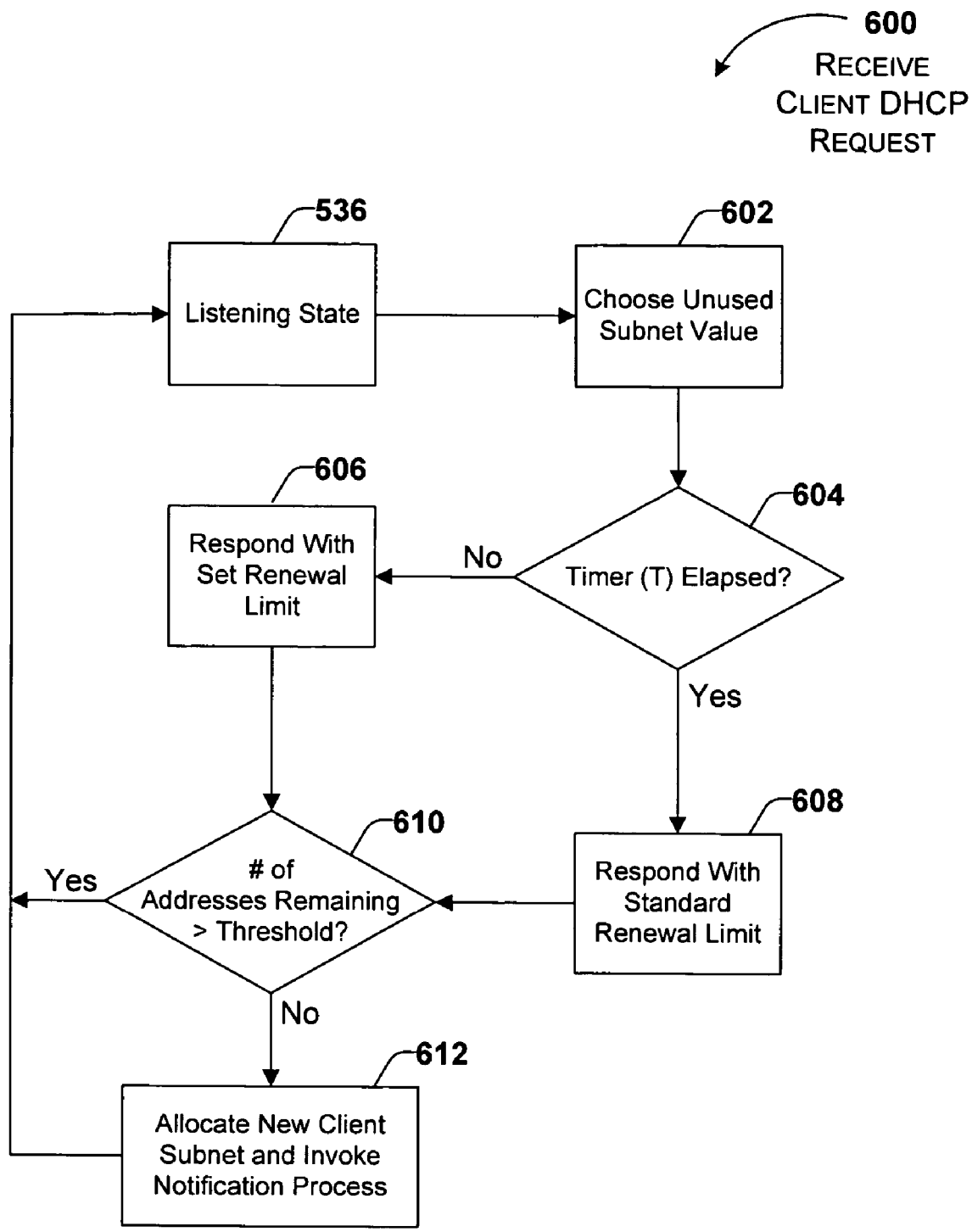
FIG. 6 illustrates an exemplary logical flow diagram of a DHCP request handling process in accordance with the present invention.

FIG. 6 illustrates an exemplary logical flow diagram of a DHCP request handling process in accordance with the present invention. Process 600 starts where a mesh node is in listening state 536 as described in the discussion of FIG. 5, and has received a DHCP request from a connected client computing device. Processing continues at block 602.

At block 602, a selection is made from the allocated client subnet range for an unused value. For example, using the 4 bit client subnet allocation described above, the client computing device may be assigned any one of the possible 16 client addresses. Once the selection is made of an unused client subnet address, processing continues at decision block 604.

At decision block 604, a determination is made whether the timer (T) period that was described in the discussion of FIG. 5 has elapsed. If the timer (T) period has not elapsed, processing moves to block 606. However, if the timer (T) period has elapsed, processing moves to block 608.

At block 606, the mesh node is configured to respond to the DHCP request with a set renewal limit (e.g., 5 minutes) that shorter that the standard renewal limit. The shorter renewal limit is used since the client subnet range allocation by the mesh node has not yet been validated. Accordingly, the renewal limit of the DHCP request is set so that the mesh node validates the client subnet address allocation at the expiration of the set renewal limit to reduce instances of conflicts. Processing continues at decision block 610.

At block 608, the mesh node is configured to respond to the DHCP request with a standard renewal limit since the timer (T) period has elapsed. The address allocations corresponding to the client subnet range have already been validated. Accordingly, a standard renewal limit may be used that acts as a "heartbeat" time period so that the mesh node periodically confirms the address allocations with the mesh network. Processing then continues at decision block 610.

At decision block 610, a determination is made whether the number of addresses remaining in the client subnet range is above a selected threshold. For example, a determination may have been made that once 60% of the client subnet range is assigned to client computing devices connected to the mesh node, additional range needs to be allocated. If the number of client subnet addresses remaining exceed the threshold, processing returns to listening state 536 as described in FIG. 5. However, if the number of client subnet addresses remaining does not exceed the threshold, processing moves to block 612.

At block 612, a new client subnet range of addresses is allocated and a notification process invoked to notify the other mesh nodes on the mesh network of the allocation. In one embodiment, the notification process corresponds to process steps 526 through 540 of FIG. 5. In another embodiment, process step 528 is skipped, since another backbone address may not need to be allocated to allocate additional client subnet addresses. Once the new client subnet addresses are allocated, processing returns to listening state 536 described in FIG. 5.

Figure 7:
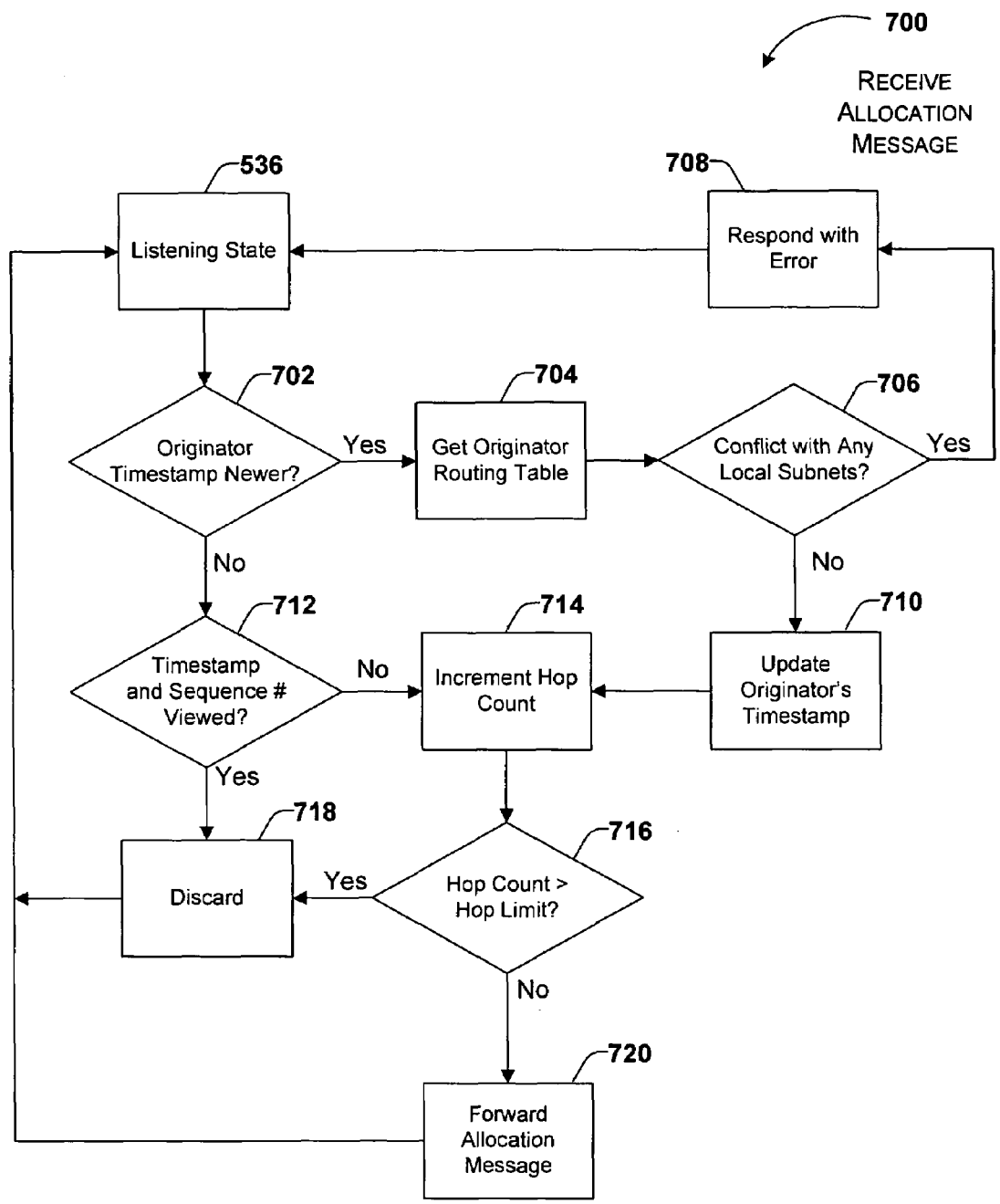
FIG. 7 illustrates an exemplary logical flow diagram of an allocation message receipt handling process in accordance with the present invention.

FIG. 7 illustrates an exemplary logical flow diagram of an allocation message receipt handling process in accordance with the present invention. Process 700 starts where a mesh node is in listening state 536 as described in the discussion of FIG. 5, and has received an allocation message from another mesh node. Processing continues at decision block 702.

At decision block 702, a determination is made whether the timestamp associated with the originator of the allocation message is newer than the timestamp that the current mesh node associates with the originating mesh node. If the timestamp is newer, processing moves to block 704. However, if the timestamp is not newer, processing moves to block 712.

At block 704, the current mesh node obtains the routing table of the originating mesh node from the sender of the allocation message. After the first hop, the sender of the allocation message and the originator of the allocation message are different. After the routing table is obtained, processing moves to decision block 706.

At decision block 706, a determination is made whether any of the allocations made according to the received allocation message conflicts with any locally allocated subnets of the current mesh node. If there is no conflict, processing advances to block 710. However, if there is a conflict, processing moves to block 708.

At block 708, the current mesh node responds to the sender of the allocation message with an error notification. The error notification will be propagated back to the originator of the allocation message. The originator of the allocation message may then choose to re-allocate its backbone and subnet addresses to resolve the conflict. After the current mesh node responds with the error notification, processing returns to listening state 536 described in FIG. 5.

If there was no conflict, at block 710 the local version of the originator's timestamp is updated to reflect the current allocation of addresses by the originating mesh node. Updating the local version of the timestamp ensure differentiation with future received allocation messages from the same originating mesh node. Processing continues at block 714.

At decision block 712, when the originator timestamp was not newer than the local version, a determination was made whether this timestamp and sequence number corresponding to the originating mesh node has been previously viewed by the current mesh node. If the timestamp and sequence number have been previously viewed by the current mesh node, processing advances to block 718. However, if the timestamp and sequence number have not been previously viewed by the current mesh node, processing moves to block 714.

At block 714, the hop count associated with the received allocation message is incremented. Incrementing the hop count indicates that the current mesh node is ready to forward the to any further neighboring mesh nodes. After incrementing the hop count, processing moves to decision block 716.

At decision block 716, a determination is made whether the hop count exceeds a hop limit. A hop limit may be set that prevents further forwarding of the allocation message. The hop limit assists in allowing a level of duplicate addresses to be used on the network without resulting in an excessive level of addressing conflicts. If the hop count does not exceed the hop limit, processing advances to block 720. However, if the hop count does exceed the hop limit, processing moves to block 718.

At block 718, the allocation message is discarded by the current mesh node. The allocation message is discarded because the current mesh node has determined that the allocation message is irrelevant to the current state of its routing table (i.e., timestamp is not new, hop limit is exceeded, etc.). After the allocation message is discarded, processing returns to listening state 536 described in FIG. 5.

In contrast, at block 720 when the allocation message is relevant, the allocation message is forwarded by the current mesh node to its neighboring mesh nodes. Forwarding the allocation message ensures synchronization among the mesh nodes on the mesh network with regard to the address space. After the allocation message is forwarded, processing returns to listening state 536 described in FIG. 5.

In an additional embodiment, the processes described in FIGS. 6 and 7 may not cycle back to a listening state as described, but instead move to additional states for further processing, such as states consistent with optimal route determination, Internet egress determination, or other states.

In still a further embodiment, a new node may come online between two established mesh networks, thereby creating a new logical mesh network comprising the contents of the two mesh networks and the new node. Using the update then forward process of the present invention allows the address space allocation from one of the two mesh nodes to be propagated through the new node to the other mesh network. After the allocation messages are forwarded to their corresponding hop limits, the two mesh networks are synchronized according to a common address space for the logical mesh network.

In yet a further embodiment, the steps of the present invention described in FIGS. 5-7 may be modified as necessary to accommodate the current version of Internet Protocol in use in connection with the peer-to-peer network. For example, certain protocol versions may circumvent the necessity to generate the logical distributed DHCP server. The protocol version may provide direct functions for publishing a subnet ID, so that a subnet may be allocated and managed without DHCP server support. The teachings of the present invention directed to maintaining a consistent address space on a P2P network are equally applicable to other protocol versions without departing from the spirit and scope of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for cooperatively managing a routed IP address space in the absence of managed network services, comprising:
   identifying cooperative agents on a backbone network;
   selecting a backbone address for a current cooperative agent on the backbone network; wherein selecting the backbone address for the current cooperative agent includes comparing a portion of a selected backbone address for the current cooperative agent with the same portion of a selected backbone address of each of the identified cooperative agents on the backbone network;
   selecting a client subnet address that corresponds to the current cooperative agent;
   receiving a notification of an allocated client subnet address from another cooperative agent; wherein relevance of the received notification is determined according to at least one of a timestamp included in the received notification and a hop count associated with the received notification;
   notifying other cooperative agents on the backbone network of the client subnet address selection;
   determining the relevance of the received notification;
   forwarding the received notification to neighboring cooperative agents when the received notification is determined as relevant; and
   discarding the received notification when the received notification is determined as irrelevant.

2. The computer-implemented method of claim 1, wherein identifying cooperative agents on the backbone network further comprises identifying mesh boxes on a mesh network.

3. The computer-implemented method of claim 1, wherein identifying cooperative agents on the backbone network further comprises broadcasting a discovery message that determines whether other cooperative agents are within communication range of the current cooperative agent.

4. The computer-implemented method of claim 3, wherein the discovery message includes an indication of randomly selected portion of the backbone address for the current cooperative agent for comparison with the same portion of backbone addresses selected by other cooperative agents.

5. The computer-implemented method of claim 4, wherein a conflict between the randomly selected portion of the backbone address for the current cooperative agent and the same portion for another cooperative agent is resolved by setting both portions to a single common value.

6. The computer-implemented method of claim 3, wherein the current cooperative agent waits for a specified time interval after broadcasting the discovery message to receive a response from other cooperative agents.

7. The computer-implemented method of claim 1, further comprising obtaining routing tables corresponding to neighboring cooperative agents of the current cooperative agent before selecting the backbone address, wherein the routing table include address allocations made by the neighboring cooperative agents.

8. The computer-implemented method of claim 1, wherein notifying other cooperative agents further comprises broadcasting an allocation message to neighboring cooperative agents, wherein the allocation message includes and indicator that the client subnet address has been allocated by the current cooperative agent.

9. The computer-implemented method of claim 8, further comprising broadcasting an additional allocation message to neighboring cooperative agents after a selected interval of time has elapsed, wherein the additional allocation message includes and indicator that the client subnet address is in use by the current cooperative agent.

10. The computer-implemented method of claim 1, further comprising selecting an unused subnet value from the client subnet address in response to a client routing request.

11. The computer-implemented method of claim 10, further comprising determining the number of remaining unused subnet values after the client routing request, wherein an additional client subnet address is allocated by the current cooperative agent when the number of remaining unused subnet values is under a specified threshold.

12. The computer-implemented method of claim 1, wherein the received notification is relevant when the timestamp occurs later than a local version of the timestamp.

13. The computer-implemented method of claim 1, wherein the received notification is irrelevant when the hop count is greater than a selected hop limit.

14. A computer-readable medium that includes computer-executable instructions for cooperatively managing a routed IP address space in the absence of managed network services, the instructions executing on a processor performing a method, comprising:
   identifying neighboring mesh nodes on a mesh network; wherein identifying mesh nodes on the mesh network further comprises broadcasting a discovery message that determines whether other mesh nodes are within communication range of the current mesh node; wherein the discovery message includes an indication of randomly selected portion of the mesh-facing address for the current mesh node for comparison with the same portion of mesh-facing addresses selected by other mesh nodes; wherein a conflict between the randomly selected portion of the mesh-facing address for the current mesh node and the same portion for another mesh node is resolved by setting both portions to a single common value;
   obtaining routing tables corresponding to any neighboring mesh nodes, wherein the routing tables include address allocations made by the neighboring mesh nodes;
   selecting a mesh-facing address for a current mesh node on the mesh network; wherein selecting the mesh-facing address for the current mesh node includes comparing a portion of a selected mesh-facing address for the current mesh node with the same portion of a selected mesh-facing address of each of the identified mesh nodes on the mesh network;
   selecting a client subnet range of addresses that corresponds to the current mesh node; and
   notifying other mesh nodes on the mesh network of the client subnet range selection by the current mesh node.

15. The computer-readable medium of claim 14, wherein notifying other mesh nodes further comprises broadcasting an allocation message to the neighboring mesh nodes, wherein the allocation message includes and indicator that the client subnet range has been allocated by the current mesh node.

16. The computer-readable medium of claim 15, further comprising broadcasting an additional allocation message to the neighboring mesh nodes after a selected interval of time has elapsed, wherein the additional allocation message includes and indicator that the client subnet address is in use by the current mesh node.

17. A system for cooperatively managing a routed IP address space in the absence of managed network services, comprising:
- a mesh network having mesh nodes included therein; and
- a logical server distributed across the mesh network that is configured to execute computer-executable instructions on each of the mesh nodes, the computer-executable instructions comprising:
- identifying neighboring mesh nodes on the mesh network by broadcasting a discovery message that determines whether other mesh nodes are within communication range of the current mesh node; wherein the discovery message includes an indication of a selected portion of the mesh-facing address for the current mesh node for comparison with the same portion of mesh-facing addresses selected by other mesh nodes; wherein the selected portion of the mesh-facing address is randomly selected; wherein the discovery message includes an indication of randomly selected portion of the backbone address for the current mesh node for comparison with the same portion of backbone addresses selected by other mesh nodes; wherein a conflict between the randomly selected portion of the backbone address for the current mesh node and the same portion for another mesh node is resolved by setting both portions to a single common value;
- obtaining routing tables corresponding to any neighboring mesh nodes, wherein the routing tables include address allocations made by the neighboring mesh nodes;
- selecting a mesh-facing address for a current mesh node on the mesh network;
- selecting a client subnet range of addresses that corresponds to the current mesh node; and
- notifying other mesh nodes on the mesh network of the client subnet range selection by broadcasting an allocation message to the neighboring mesh nodes, wherein the allocation message includes and indicator that the client subnet range has been allocated by the current mesh node.

18. The system of claim 17, wherein the logical server is further configured to broadcast an additional allocation message to the neighboring mesh nodes after a selected interval of time has elapsed, wherein the additional allocation message includes and indicator that the client subnet address is in use by the current mesh node.

19. The system of claim 17, wherein the computer-executable instructions further comprise:
- selecting an unused subnet value from the client subnet range in response to a client routing request; and
- determining the number of remaining unused subnet values after the client routing request, wherein an additional client subnet range is allocated by the current mesh node when the number of remaining unused subnet values is under a specified threshold.

20. The system of claim 17, wherein the computer-executable instructions further comprise:
- receiving a notification of an allocated client subnet address from another cooperative agent;
- determining the relevance of the received notification;
- forwarding the received notification to neighboring cooperative agents when the received notification is determined as relevant; and
- discarding the received notification when the received notification is determined as irrelevant.

21. The system of claim 20, wherein relevance of the received notification is determined according to at least one of a timestamp included in the received notification and a hop count associated with the received notification.

* * * * *